United States Patent
Quan

(10) Patent No.: US 10,719,801 B2
(45) Date of Patent: Jul. 21, 2020

(54) PRE-PACKED SHIPMENT TRANSFORMABLE TO INVENTORY RECEPTACLE FOR DISTRIBUTOR

(71) Applicant: Amazon Technologies, Inc., Seattle, WA (US)

(72) Inventor: Adrian Christopher Quan, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 565 days.

(21) Appl. No.: 15/282,675

(22) Filed: Sep. 30, 2016

(65) Prior Publication Data

US 2018/0096288 A1 Apr. 5, 2018

(51) Int. Cl.
G06Q 10/08 (2012.01)
G01C 21/00 (2006.01)
G06K 7/10 (2006.01)

(52) U.S. Cl.
CPC ........... *G06Q 10/083* (2013.01); *G01C 21/00* (2013.01); *G06K 7/10009* (2013.01); *G06Q 10/087* (2013.01); *G06Q 10/0832* (2013.01); *G06Q 10/0875* (2013.01)

(58) Field of Classification Search
CPC ........ G08B 13/14; G08B 13/22; B65D 25/00; B65D 17/00; B65D 83/04; B65D 25/20
USPC ........ 705/27.1, 2, 3; 1/1; 206/528, 279, 526, 206/531; 340/572.1, 10.1; 422/400, 547
See application file for complete search history.

(56) References Cited

U.S. PATENT DOCUMENTS

| | | | | |
|---|---|---|---|---|
| 6,557,758 B1* | 5/2003 | Monico | ..................... | B07C 3/18 235/380 |
| 7,156,290 B2* | 1/2007 | Stemmle | ................ | B65D 27/30 235/375 |
| 7,504,949 B1* | 3/2009 | Rouaix | .................. | G06Q 10/06 340/572.1 |
| 7,887,755 B2* | 2/2011 | Mingerink | .......... | B05B 11/0005 206/459.5 |
| 8,063,781 B2* | 11/2011 | Dewan | ............. | G06K 19/07327 235/380 |
| 8,224,664 B1* | 7/2012 | Louie | .................... | G06Q 10/083 705/2 |
| 8,479,988 B2* | 7/2013 | Louie | .................. | G06F 19/3462 235/385 |

(Continued)

OTHER PUBLICATIONS

PCT/US2017/054235, "International Search Report and Written Opinion", dated Jan. 2, 2018, 15 pages.

(Continued)

*Primary Examiner* — Olusegun Goyea
(74) *Attorney, Agent, or Firm* — Kilpatrick Townsend & Stockton LLP

(57) ABSTRACT

An inventory receptacle can include a body that includes a plurality of walls arranged to at least partially bound a storage volume. A computer-readable identifier connected with the body may be associated with an electronically-stored record about items registered as being present in the storage volume. A cover may be detachably coupled with the body so as to at least partially bound the storage volume in an arrangement that blocks access to the computer-readable identifier and to the storage volume. The cover may be configured for detachment from the body so as to allow access to the computer-readable identifier and the storage volume.

20 Claims, 6 Drawing Sheets

(56) References Cited

U.S. PATENT DOCUMENTS

| | | | | |
|---|---|---|---|---|
| 8,659,395 B2* | 2/2014 | Kilian | | G06K 7/0008 340/10.1 |
| 9,457,474 B1* | 10/2016 | Lisso | | B25J 9/1697 |
| 9,840,351 B1* | 12/2017 | Russell | | B65D 5/5445 |
| 9,963,912 B2* | 5/2018 | Carr | | G07F 11/002 |
| 2004/0099547 A1* | 5/2004 | Ford | | B65D 5/4212 206/279 |
| 2007/0001854 A1* | 1/2007 | Chung | | G08B 13/02 340/572.1 |
| 2007/0013519 A1* | 1/2007 | Chung | | G06Q 10/08 340/572.1 |
| 2008/0004798 A1* | 1/2008 | Troxler | | A01K 15/023 702/187 |
| 2008/0030326 A1 | 2/2008 | Gal et al. | | |
| 2008/0069736 A1* | 3/2008 | Mingerink | | B05B 11/0005 422/400 |
| 2009/0014350 A1* | 1/2009 | Gaumont | | A61J 1/035 206/528 |
| 2010/0156642 A1* | 6/2010 | Lindsay | | G06K 19/0716 340/572.7 |
| 2011/0285507 A1* | 11/2011 | Nelson | | G06K 19/0739 340/10.1 |
| 2012/0085817 A1* | 4/2012 | Gatrost | | B65D 5/5445 229/240 |
| 2013/0001282 A1 | 1/2013 | Weller et al. | | |
| 2013/0126377 A1* | 5/2013 | Hammer | | B65D 25/00 206/449 |
| 2013/0346255 A1* | 12/2013 | Hayden | | B65D 85/185 705/27.1 |
| 2016/0371516 A1* | 12/2016 | Debates | | G06K 19/07726 |
| 2017/0196128 A1* | 7/2017 | Elizondo, II | | G06F 1/182 |
| 2017/0281431 A1* | 10/2017 | Louwrens | | A61F 15/001 |

OTHER PUBLICATIONS

PCT/US2017/054235, "International Preliminary Report on Patentability", dated Apr. 11, 2019, 9 pages.

* cited by examiner

PRE-PACKED SHIPMENT TRANSFORMABLE TO INVENTORY RECEPTACLE FOR DISTRIBUTOR

BACKGROUND

Many modern inventory fulfillment systems consolidate, ship, and otherwise handle a large volume of inventory items. Often times, reductions in shipping time and/or other advantages may be obtained by maintaining stocks of inventory at various locations that are geographically near to the end-users that submit orders for fulfillment. However, costs of building, organizing, and/or otherwise establishing operational repositories of inventory that can be effectively used for fulfillment of orders near end-users in many situations may be prohibitive.

BRIEF DESCRIPTION OF THE DRAWINGS

Various embodiments in accordance with the present disclosure will be described with reference to the drawings, in which.

DETAILED DESCRIPTION

Figure 1:
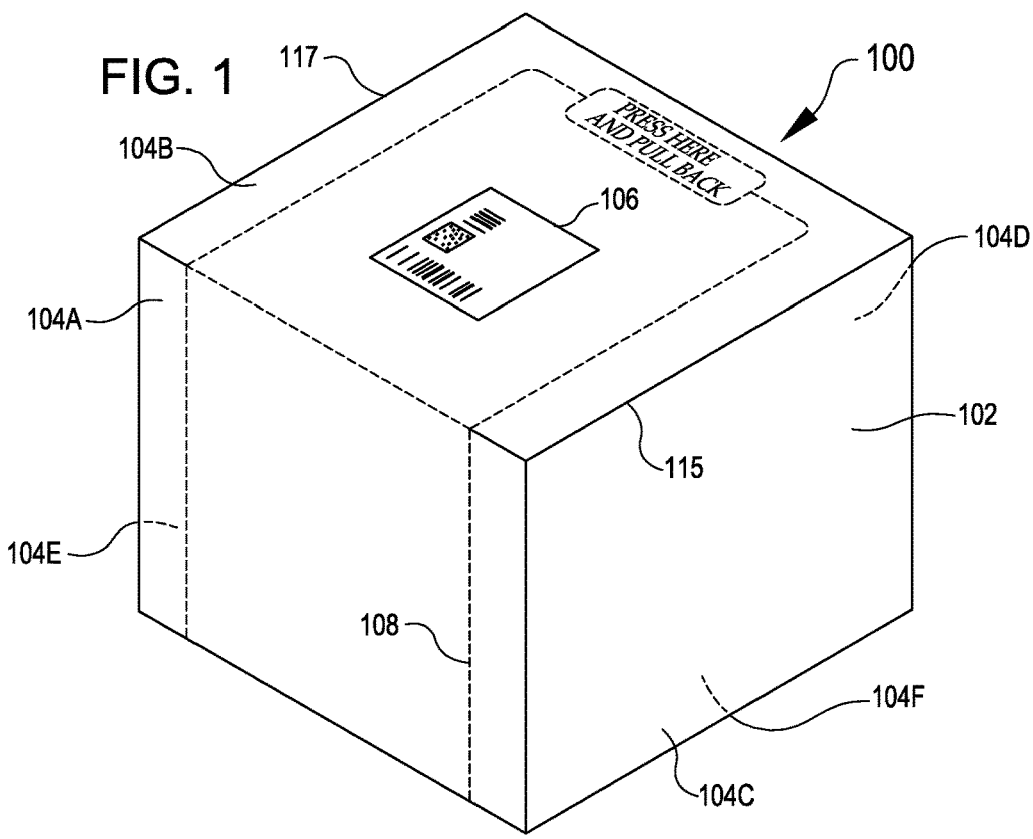
FIG. 1 illustrates an example of an inventory receptacle in a shipping mode in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include use of receptacles shipped to distributors, for example to facilitate establishment of inventory stockpiles in geographic regions near end-users. In some scenarios, although a service provider (e.g., a first party) may receive an order from a customer or end-user (e.g., a second party), inventory stockpiles may be maintained by a separate distributor (e.g., a third-party) and utilized to fulfill the order. To facilitate such arrangements, a service provider may cause inventory items to be shipped to a distributor, e.g., so that the distributor is prepared for handling orders to be received from end-users in the future. The distributor, for example, could be a warehouse owner, a garage owner, a retailer with under-utilized back-room space, or some other entity having space or extra space available for product storage. Inventory items may be shipped to the distributor in receptacles that facilitate efficient handling of the items for order fulfillment.

In an example embodiment, the service provider may send the distributor a box pre-filled with items to be added into inventory of the distributor. The box has a tear-away lid that reveals the products and a unique identifier (e.g., bar code and serial number), which the distributor scans using a smartphone, tablet, or other suitable device. When the unique identifier of the box is scanned, an electronic record reflecting the items that were pre-filled into the box is accessed. Based on this list, the contents of the box are electronically registered as present in the inventory of the distributor. The shipping box with the lid removed may also function as a bin from which the distributor may pick for fulfilling orders once received. For example, the distributor can place the box on a shelf and register the box's location within the storage space so that the box can be readily located later when an ordered item is to be retrieved from the box. When an order is received, the distributor's device may indicate the box or bin's serial number and/or location to indicate where to find an ordered item. The distributor can pick the item from the designated box, and, for example, to confirm or track the items used in fulfilling the order, the distributor can scan the box's identifier and/or an identifier of the item.

Thus, in comparison to inventory intake processes that may involve receiving a shipped box of items, decanting or separating the items from the box, organizing the separated items into respective bins, and registering the separate items as located within the respective bins, techniques herein that allow the distributor to introduce received items into inventory by simply opening the box and scanning the box identifier may reduce time consumption and opportunities for introduction of errors that may otherwise occur at each respective "touch" of the inventory during the intake process. Techniques described herein may also be effective to provide a system of a system of storing and locating items for distributors that can be adequate reliability metrics of the service provider.

Referring now to the drawings, FIG. 1 illustrates an example of an inventory receptacle 100. The inventory receptacle 100 has a body 102 formed of walls 104 (e.g., individually identified in FIG. 1 as a front wall 104A, a top wall 104B, a right wall 104C, a rear wall 104D, a left wall 104E, and a bottom wall 104F). The walls 104 may be formed of cardboard or any other suitably durable material for supporting and/or containing items during shipment and/or subsequent handling. The receptacle 100 may be formed by any suitable combination of folding, taping, affixing, tucking, or other construction techniques. Although FIG. 1 illustrates six walls 104 forming a box-shape for the receptacle 100, the receptacle 100 may include any other number of walls 104 and/or may resemble any other suitable form factor. A shipping label 106 is shown affixed to the inventory receptacle 100, for example, to facilitate shipment of the inventory receptacle 100 via parcel delivery services, mail couriers, etc. A perforation pattern 108 is also shown in FIG. 1 extending along respective portions of the front wall 104A and of the top wall 104B.

Figure 2:
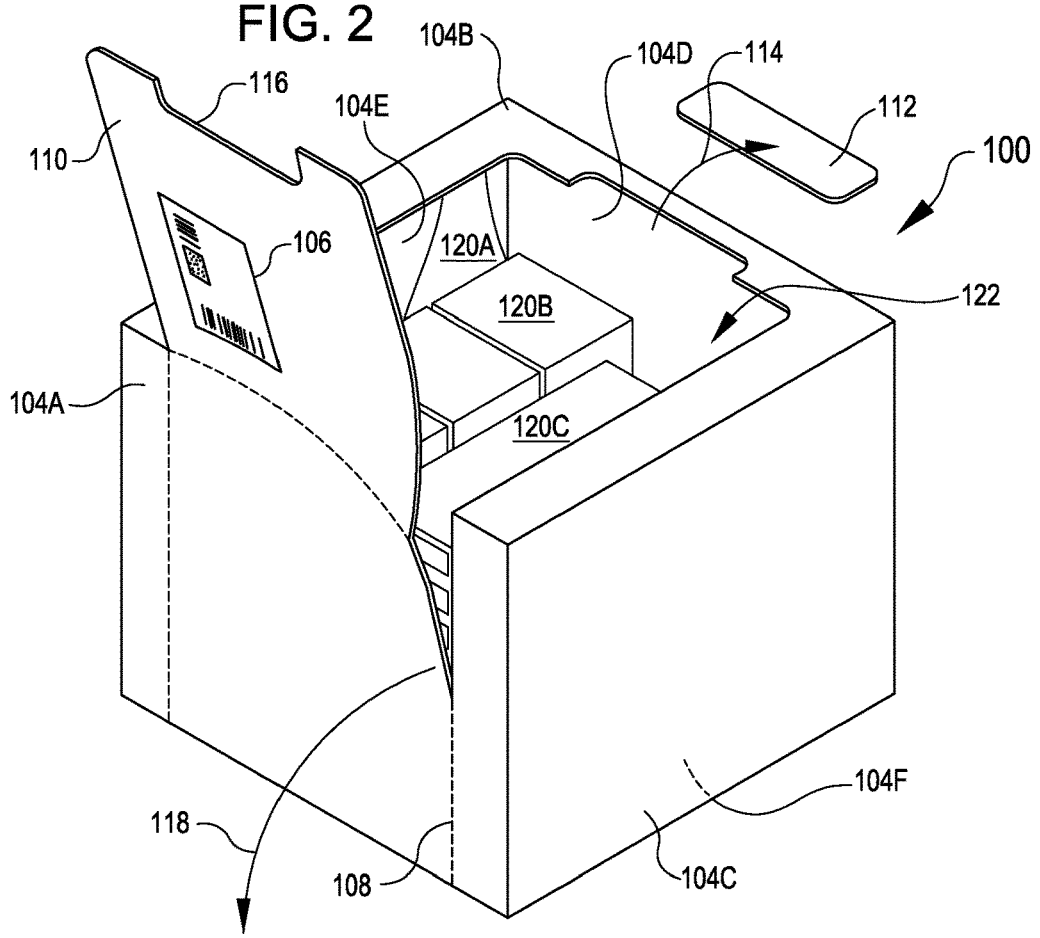
FIG. 2 illustrates removal of a portion of the inventory receptacle of FIG. 1 for conversion to a deployed mode in accordance with embodiments.

Referring to FIG. 2, the perforation pattern 108 may define edges of a flap or cover 110 that is detachable from the inventory receptacle 100. In the embodiment shown in FIG. 2, the perforation pattern 108 also defines a punch-out tab 112. The punch-out tab 112 is sized and shaped so that a person can press down on the tab 112 with fingers or another implement to cause separation that allows the punch-out tab 112 to be pushed into the inventory receptacle 100 or otherwise removed (as at arrow 114). Removal of the punch out tab 112 may leave a handle contour 116, which may provide space for a person to insert fingers or another implement into the inventory receptacle 100, such as to secure a grip on the cover 110. Pulling away from the inventory receptacle 100 on the cover 110 (e.g., by gripping the handle contour 116) can cause tearing along the perforation pattern 108, which may separate the cover 110 from the inventory receptacle 100 (as at arrow 118). Although the perforation pattern 108 is shown on the front wall 104A and top wall 104B in FIG. 1, other arrangements are also possible. In various embodiments, the perforation pattern 108 extends across two adjacent walls 104 so as to allow access into the receptacle 100 from multiple faces when the cover 110 has been removed. Additionally, although the perforation pattern 108 is shown in FIGS. 1-2, the cover 110 may alternatively be detachable from the receptacle 100 through any other technique, including, but not limited to, cutting along lines printed on the receptacle, severing tape or other adhesive holding the cover 110 to the receptacle 100, untucking flaps from receiving slots, and/or disengaging fasteners holding the cover 110 to the receptacle.

Detaching or otherwise removing the cover 110 from the inventory receptacle 100 may expose contents of the inventory receptacle 100 such as inventory items 120 (individually identified as inventory items 120A, 120B, and 120C in FIG. 2). The inventory items 120 or other contents may be positioned in a storage volume 122 of the inventory receptacle 100. The storage volume 122 may be bounded at least partially by body 102 and/or the cover 110. For example, the walls 104 may enclose the storage volume 122 when the inventory receptacle 100 is in the shipping mode shown in FIG. 1.

Figure 3:
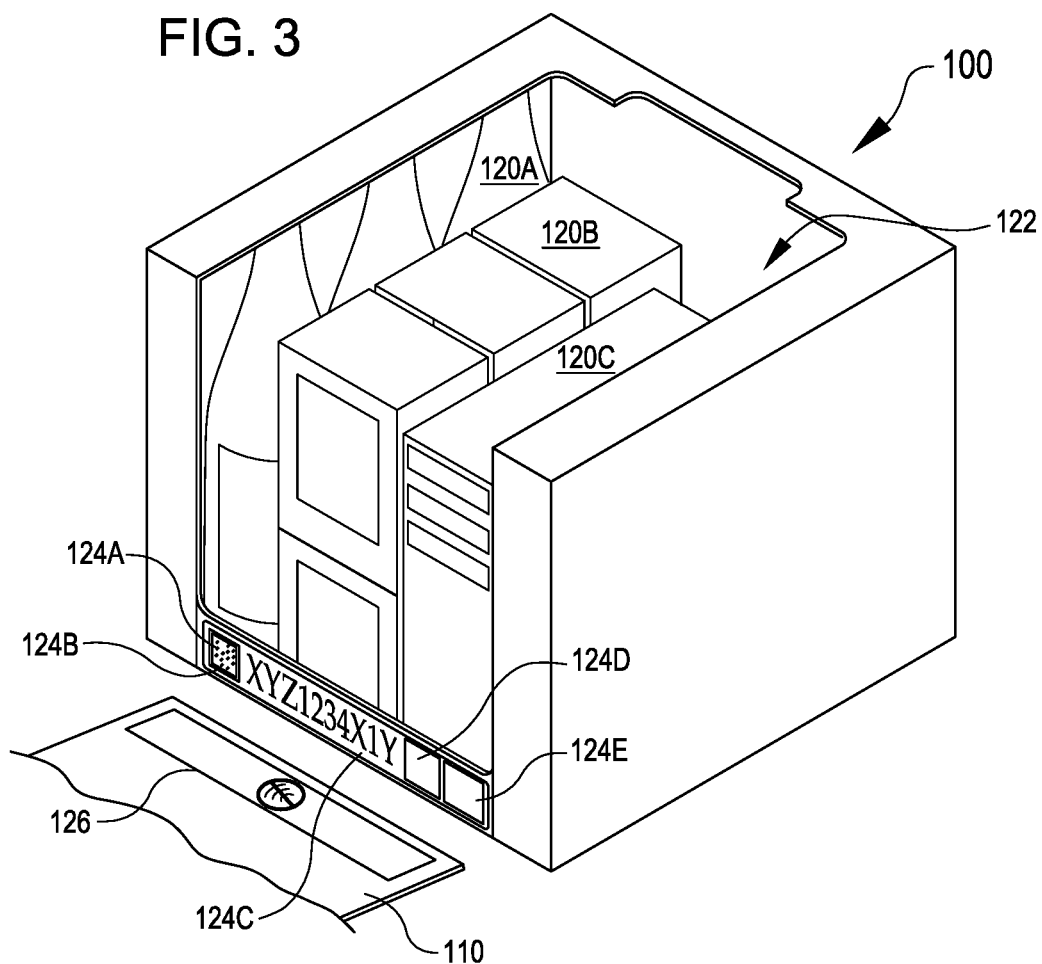
FIG. 3 illustrates a deployed mode of the inventory receptacle of FIGS. 1-2 in accordance with embodiments.

Referring to FIG. 3, removing the cover 110 from the inventory receptacle 100 may also expose one or more identifiers 124 (individually identified as 124A, 124B etc. in FIG. 3). The identifiers 124 may include one or more computer-readable identifiers 124, such as a barcode 124A and/or a radio frequency identification (RFID) tag 124B (e.g., located in a label on which the barcode 124A is printed in FIG. 3). The computer-readable identifiers 124 may be associated with an electronically-stored record about items 120 registered as being present in the storage volume 122. For example, scanning a computer-readable identifier 124 with an appropriate reader in various embodiments may be a sufficient action to cause the items 120 present in the inventory receptacle 100 to be registered as present within the inventory of a distributor to whom the inventory receptacle 100 has been shipped.

The identifiers 124 may also include human readable identifiers 124, such as a serial number 124C and/or location identifiers such as a row designation 124D and a column designation 124E. Generally, human-readable identifiers 124 may be useful for facilitating identification and/or location of the inventory receptacle 100 among others, for example, when a person is tasked with retrieving in item 120 from the inventory receptacle 100 to fulfill an order from a customer. Thus, although particular examples of human-readable identifiers are shown in FIG. 3, other human-readable identifiers 124 may be used (including, but not limited to, any combination of numbers, text, and/or other symbols) and used for indicating a unique identity and/or a unique location of the inventory receptacle so as to facilitate access by a person to the receptacle for retrieval of an item 120 registered as being present in the storage volume 122.

As previously noted, removing the cover 110 from the inventory receptacle 100 may expose contents of the inventory receptacle 100 such as inventory items 120. Thus, with the cover 110 removed, the inventory receptacle 100 may provide a suitable structure or bin in which to maintain inventory items 120 until requested for fulfilling an order. The inventory receptacle 100 may also provide a suitable structure or bin from which to pick inventory items 120 that are requested for fulfilling an order. Although the inventory items 120 are shown individually packed into the inventory receptacle 100, in some embodiments the inventory receptacle 100 may include drawers or otherwise be packed in an arrangement that includes multiple inventory items 120 collected into separable groups within the inventory receptacle 100./

In FIG. 3, the cover 110 is shown bearing a disabler 126. The disabler 126 may function to disable the RFID tag 124B until the cover 110 is removed. For example, the disabler 126 may include suitable shielding material that blocks transmissions from the RFID tag 124B from being read. As another example, the disabler 126 may include circuitry or other elements that disable the RFID tag 124B when the disabler 126 is present in contact or proximate to the RFID tag 124B, yet allow the RFID tag 124B to function normally in the absence of the disabler 126. Thus, the cover 110 may function to visually and or otherwise operatively block access to identifiers 124 and items 120 when the cover 110 is present (e.g., in FIG. 1 and FIG. 2), and visual or operative access may be allowed in the absence of the cover 110 (e.g., in FIG. 3). Moreover, although the location of the shipping label 106 on the removable cover 110 shown in FIGS. 1-2 may cause the shipping label 106 to be removed from the receptacle 100 when no longer needed when the cover 110 is removed, the shipping label 106 may alternatively be located elsewhere on the receptacle 100.

Figure 4:
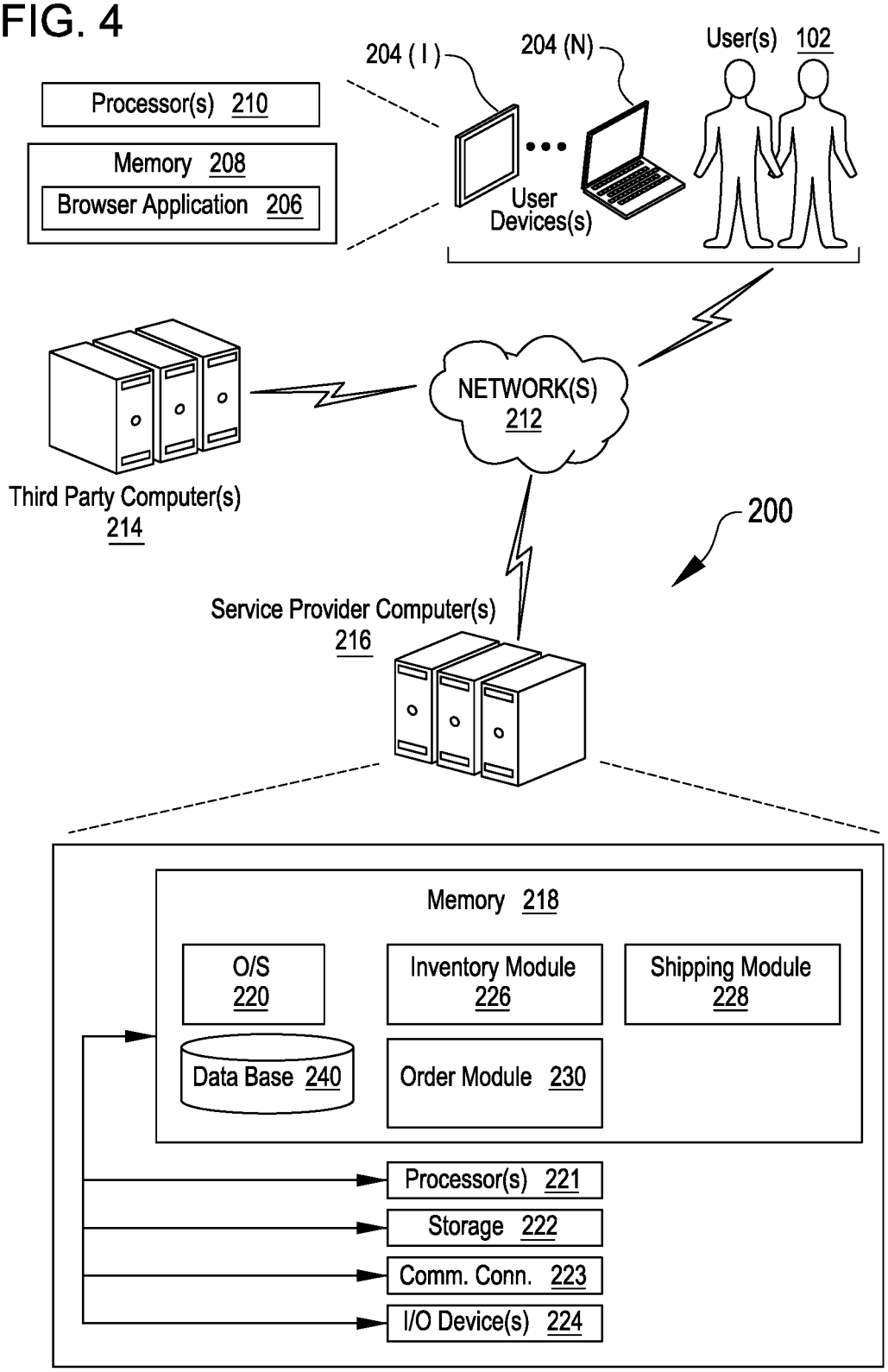
FIG. 4 is a schematic diagram depicting an illustrative system or architecture in which techniques related to the inventory receptacle of FIGS. 1-3 may be implemented in accordance with embodiments.

FIG. 4 depicts an illustrative system or architecture 200 in which techniques related to the inventory receptacle 100 of FIGS. 1-3 may be implemented via computer systems 106. In architecture 200, one or more users 102 may utilize user computing devices 204(1)-(N) (collectively, user devices 204) to access a browser application 206 (e.g., a web browser) or a user interface (UI) accessible through the browser application 206, via one or more networks 212. The "browser application" 206 can be any browser control or native application that can access and display a network page or other information. In some aspects, the browser application 206 may be hosted, managed, and/or provided by a computing resources service or service provider, such as by utilizing one or more service provider computers 216. The one or more service provider computers 216 may, in some examples, provide computing resources such as, but not limited to, client entities, low latency data storage, durable data storage, data access, management, virtualization, hosted-computing-system-based software solutions, electronic content performance management, etc. The one or more service provider computers 216 may also be operable to provide web or network hosting, computer application development, and/or implementation platforms, combinations of the foregoing, or the like to the one or more users 102.

In one illustrative configuration, the user devices 204 may include at least one memory 208 and one or more processing units or processor(s) 210. The processor(s) 210 may be implemented as appropriate in hardware, computer-executable instructions, firmware, or combinations thereof. Computer-executable instruction or firmware implementations of the processor(s) 210 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 208 may store program instructions that are loadable and executable on the processor(s) 210, as well as data generated during the execution of these programs. Depending on the configuration and type of user device 204, the memory 208 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 208 may include multiple different types of memory, such as static random access memory (SRAM), dynamic random access memory (DRAM), or ROM.

Turning to the components of the memory 208 in more detail, the memory 208 may include an operating system and one or more application programs or services for implementing the features disclosed herein via the browser application 206 or dedicated applications (e.g., smart phone applications, tablet applications, etc.). The browser application 206 may be configured to receive, store, and/or display a website, a link to an electronic marketplace, or other interface for interacting with the one or more service provider computers 216. Additionally, the memory 208 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 102 provided response to a security question or a geographic location obtained by the user device 204.

In some examples, the networks 212 may include any one or a combination of many different types of networks, such as cable networks, the Internet, wireless networks, cellular networks and other private and/or public networks. While the illustrated example represents the users 102 accessing the browser application 206 over the networks 212, the described techniques may equally apply in instances where the users 102 interact with the one or more service provider computers 216 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 206 may allow the users 102 to interact with the one or more service provider computers 216 (e.g., the computer systems 106 of the service provider 101), such as to access content like webpages or network pages. The one or more service provider computers 216, perhaps arranged in a cluster of servers or as a server farm, may host the browser application 206 and/or cloud-based software services. Other server architectures may also be used to host the browser application 206 and/or cloud-based software services. The browser application 206 may be capable of handling requests from many users 102 and serving, in response, various user interfaces that can be rendered at the user devices 204 such as, but not limited to, a webpage, a website, network site, or network page. The browser application 206 can interact with any type of website or network site that supports user interaction, including social networking sites, electronic retailers, informational sites, blog sites, search engine sites, news and entertainment sites, and so forth. The described techniques can similarly be implemented outside of the browser application 206, such as with other applications running on the user device 204.

The one or more service provider computers 216 may be any type of computing device such as, but not limited to, a mobile phone, a smart phone, a personal digital assistant (PDA), a laptop computer, a desktop computer, a server computer, electronic book (e-book) reader, a thin-client device, a tablet PC, etc. Additionally, it should be noted that in some embodiments, the one or more service provider computers 216 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 216 may be in communication with the user device 204 via the networks 212, or via other network connections. The one or more service provider computers 216 may include one or more servers, perhaps arranged in a cluster or as individual servers not associated with one another. The one or more service provider computers 216 may be in communication with one or more third party computers 214 via networks 212. The one or more service provider computers 216 that host the browser application 206 may obtain and provide data to third party computers 214 via networks 212 in accordance with embodiments described herein.

In one illustrative configuration, the one or more service provider computers 216 may include at least one memory 218 and one or more processing units or processors(s) 221. The processor(s) 221 may be implemented as appropriate in hardware, computer-executable instructions, firmware, or combinations thereof. Computer-executable instruction or firmware implementations of the processor(s) 221 may include computer-executable or machine-executable instructions written in any suitable programming language to perform the various functions described. The memory 218 may store program instructions that are loadable and executable on the processor(s) 221, as well as data generated during the execution of these programs. Depending on the configuration and type of the one or more service provider computers 216, the memory 218 may be volatile (such as RAM) and/or non-volatile (such as ROM, flash memory, etc.). The one or more service provider computers 216 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 218 may include multiple different types of memory, such as SRAM, DRAM, or ROM.

The memory 218, the additional storage 222, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the one or more service provider computers 216 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium, which can be used to store the desired information and which can be accessed by the one or more service provider computers 216. Combinations of any of the above should also be included within the scope of computer-readable media.

The one or more service provider computers 216 may also contain communication connection(s) 223 that allow the one or more service provider computers 216 to communicate with a stored database, another computing device or server, user terminals and/or other devices on the networks 212. The one or more service provider computers 216 may also include I/O device(s) 224, such as a keyboard, a mouse, a pen, a voice input device, a touch input device, a display, speakers, a printer, etc.

Turning to the contents of the memory 218 in more detail, the memory 218 may include an operating system 220, one or more data stores 240 and/or one or more application programs, services, or other software modules, which are generally executed by a processor (e.g., the processors 210 and/or 221) for implementing the features disclosed herein.

Example modules are shown in FIG. 4, but functions and embodiments described herein can utilize a subset of the features provided by the modules and/or additional functions can be provided. Additionally, while the example modules will now be briefly discussed with regard to FIG. 4, further specific details regarding the example modules are provided below in the descriptions of subsequent Figures.

As an example module of memory 218, an inventory module 226 can be provided for receiving, sending, updating, and/or otherwise processing information about inventory available for fulfilling orders received from users 102 for items. A shipping module 228 can be provided for handling details associated with shipping items for fulfilling orders, such as interfacing with shipping companies or other carriers to cause inventory items to be moved from place to place. An order module 230 can be provided for handling information and/or instructions associated with orders from users 102 for items.

Figure 5:
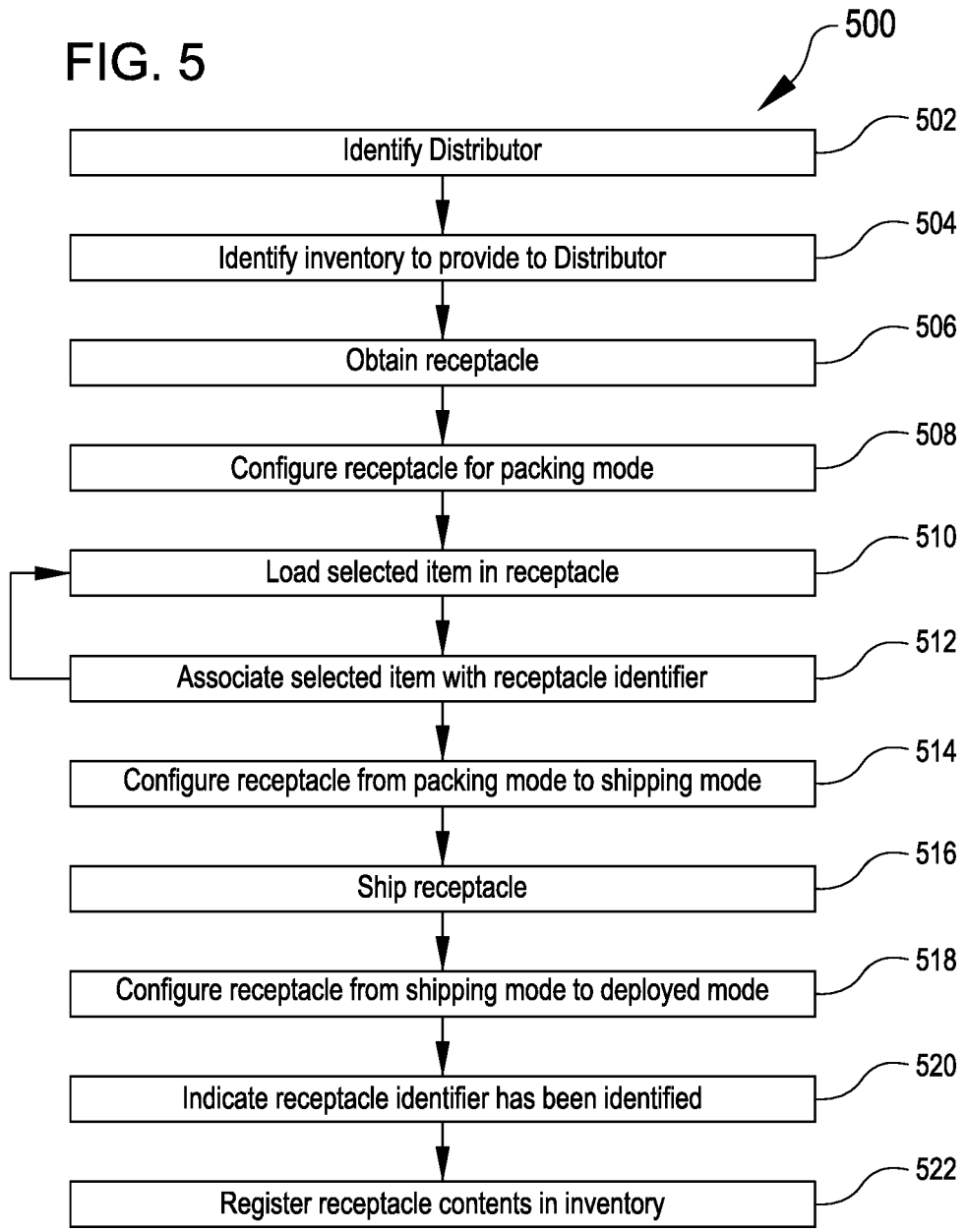
FIG. 5 is a flowchart illustrating a process of introducing items into an inventory of a distributor such as by use of the receptacle of FIGS. 1-3 in accordance with embodiments.

FIG. 5 is a flow chart representing an example of a process 500 for providing inventory to a distributor such as by use of the receptacle 100 of FIGS. 1-3 in accordance with some embodiments. Some or all of the process 500 (or any other processes described herein, or variations and/or combinations thereof) may be performed under the control of one or more computer systems configured with executable instructions, such as the modules described herein, and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. Moreover, unless indicated otherwise, acts shown in the processes are not necessary performed in the order shown, and/or some acts can be omitted in embodiments.

The process 500 at 502 can include identifying a distributor. For example, the order module 230 of the service provider computers 216 may be configured to receive orders submitted from users 102 through user device 204, and the process 500 at 502 may correspond to the inventory module 226 determining a suitable distributor for fulfilling such orders already received or to be received in the future. In some embodiments, the distributor may be a third-party, e.g., an entity associated with the third party computers 214. In other embodiments, however, the distributor may correspond to a subsidiary of the service provider or may correspond to some other entity associated with the service provider computers 216. Examples of suitable distributors include, but are not limited to, entities that have contracted with the service provider to provide storage space and associated fulfillment operations (e.g., a warehouse owner, a garage owner, a retailer with under-utilized back-room space), fulfillment centers operated directly by the service provider, permanent fulfillment centers, temporary fulfillment centers, existing fulfillment centers, pop-up fulfillment centers, fulfillment centers for rapid fulfillment of orders, and/or drivers tasked with delivering ordered inventory items.

The process 500 at 504 can include identifying inventory items 120 to provide to the distributor identified at 502. For example, the inventory module 226 may determine a set of inventory items 120 that would be suitable to provide to a third-party distributor based on information about that third-party distributor. Examples of such information include, but are not limited to, information about an amount of storage capacity available to the distributor, an existing known inventory of the distributor, and/or items that have historically or otherwise are expected to be ordered by users in a geographic region that the distributor is intended to serve. As another example, the inventory module 226 may receive information from the order module 230 about multiple orders received and determine an appropriate set of inventory items 120 that may be loaded into an inventory receptacle 100 so that a delivery driver may access the inventory receptacle 100 at various stops along a delivery route to accomplish fulfillment of those orders.

The process 500 at 506 can include obtaining a receptacle. This may correspond to the inventory receptacle 100. For example, the inventory module 226 may instruct obtaining a receptacle that will be suitably sized for receiving the inventory items 120 identified at 504. In some embodiments, the receptacle 100 may be obtained in an unfolded or otherwise partially uncompleted form.

The process 500 at 508 can include configuring the receptacle for a packing mode. For example, the inventory module 226 may provide instructions to an operator to perform suitable operations on the receptacle 100 for receiving inventory items 120. Such operations may include folding and/or assembling respective walls 104 of the inventory receptacle 100 such that the computer-readable identifiers 124 are unobstructed by the cover 110 and/or such that the storage volume 122 is accessible for receiving the items 120.

The process 500 at 510 can include loading a selected item into the receptacle. This may include the inventory module 226 providing instructions to an operator to place items identified at 504 into the storage volume 122 of the receptacle 100.

The process 500 at 512 can include associating the selected item with the receptacle identifier. This may include the inventory module 226 receiving an identification of the computer readable identifier 124 (e.g., such as from an operator scanning the barcode 124A and/or the RFID tag 124B) and also receiving an identification of the item 120 (e.g. such as from an operator scanning a barcode, RFID tag, and/or other identification device of the item 120). Associating the selected item 120 with the receptacle identifier 124 may correspond to updating electronic record associated with receptacle identifier 124 to reflect that the selected item 120 is present in the storage volume 122.

In some embodiments, the process 500 may repeat operations 510 and 512, as illustrated by arrow 513 in FIG. 5. This may correspond to loading and associating multiple items 120 into the storage volume 122 of the receptacle 100. Such iterating or repetition may occur, for example, until the receptacle 100 no longer has space for additional items 120, and/or until no items identified at 504 remain to be loaded for delivery to the distributor identified 502. In some embodiments, if additional items identified at 504 cannot fit into a receptacle 100, additional receptacles 100 may be utilized, for example, by obtaining additional receptacles as at 506 and proceeding through the process 500 for such additional receptacles.

The process 500 at 514 can include configuring the receptacle from packing mode to shipping mode. For example, the shipping module 228 may provide instructions to an operator to perform suitable operations to prepare the receptacle 100 for shipment. Such operations may include folding and/or assembling respective walls 104 of the inventory receptacle 100 to enclose the storage volume 122. As an illustrative example, the front wall 104A and the top wall 104B may be brought into engagement along respective edges 115 and 117 of the right wall 104C and the left wall 104E and be folded, tucked, taped, and/or otherwise secured in such engagement to convert the receptacle 100 from a packing mode to the shipping mode shown in FIG. 1. Configuring the receptacle 100 from the packing mode to the shipping mode shown in FIG. 1 may include causing the cover 100 to cover and/or block the identifiers 124 and/or to restrict access to the storage volume 122 for receiving the items 120.

Figure 8:
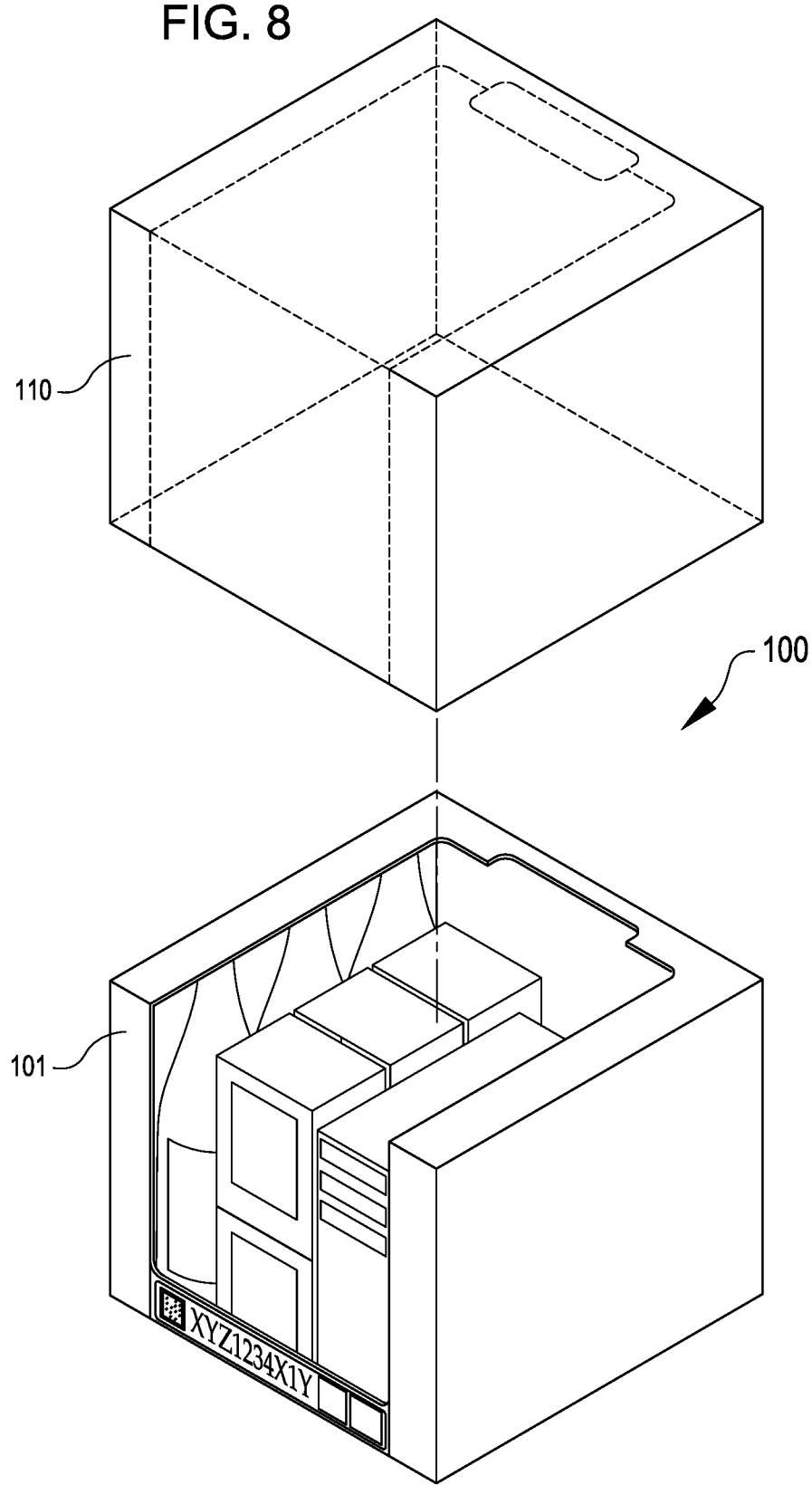
FIG. 8 illustrates an example of a portion of a process of converting the receptacle of FIGS. 1-3 from a packing mode to a shipping mode in accordance with embodiments.

In some embodiments, for example, as may be appreciated with respect to FIG. 8, the receptacle 100 may include multiple parts that are joined or assembled together for conversion to the shipping mode. In FIG. 8, assembly of the receptacle 100 is shown by placing a cover 110 over a base 101. The cover 110 and the base 101 can be secured together by peel-back adhesive strips, staples, and/or any other suitable fasteners. Although the assembly shown in FIG. 8 will result in the receptacle being multiple layers thick in particular places (e.g., two layers of cardboard thick along the left, right, rear, and bottom, while the top and front in large part will only include one layer of cardboard), other arrangements are also possible, including, but not limited to arrangements with a single-layer or a multiple layer thickness present in other locations than those resulting from the depicted construction. Additionally, although the depicted base 101 is shown having a similar form factor to the receptacle 100 in the deployed mode shown in FIG. 3, the base 101 may additionally or alternatively include different numbers, arrangements, and/or sizes of walls. For example, the base 101 may correspond to a tray having perimeter walls that do not extend a full height of items 120 to be packed, which will instead be boxed in by walls added by the cover 110.

The process 500 at 516 can include shipping the receptacle. For example the shipping module 228 may include appropriate instructions for printing and/or affixing labels 106 for mail, shipping, or other carrier services to bear the receptacle 100 to appropriate destination for distributor identified at 502. In some aspects, the shipping module 228 may provide instructions for movement of the receptacle 100 to a suitable location for pickup by a carrier service or other delivery system.

The process 500 at 518 can include configuring the receptacle from the shipping mode to a deployed mode. This may correspond to the distributor (e.g., subsequent to receiving the shipped receptacle 100) removing the cover 110 from the receptacle 100 (e.g., as at arrow 118 in FIG. 2 and converting the receptacle 100 from the state shown in FIG. 1 to the state shown in FIG. 3). In the deployed mode, the cover 110 may be arranged so that access is available into the storage volume 122 for the retrieval and/or deposit of items 120. In the deployed mode, the cover 110 may be arranged so that the identifiers 124 are accessible.

The process 500 at 520 can include indicating that the receptacle identifier has been identified. For example, the inventory module 226 may receive an indication that the barcode 124A and/or that the RFID tag 124B has been read from the receptacle 100, such as by a device operated by a distributor upon removing the cover 110 to open the receptacle 100. Such an indication may provide confirmation that the receptacle 100 has been received and/or that the receptacle 100 has been opened so that items 120 are available for use in fulfilling orders.

The process 500 at 522 can include registering receptacle contents in inventory of the distributor. This may be done in response to the indication from operation 520. For example, in response to receiving an indication that the indicator 124 has been read, the inventory module 226 may access the electronic record associated with the receptacle identifier 124 to determine items 120 that were loaded into the receptacle at 510. The inventory module 226 may update a listing of inventory of the distributor to reflect the items 120 that were loaded into the receptacle 510. Such a designation may be reasonable based on the identifiers 124 being unavailable to be scanned until the cover 110 is removed by the distributor for accessing the items 120.

In some aspects, other actions additionally or alternatively can be taken in response to receiving the indication that the receptacle identifiers have been identified at 522. For example, in a situation where a distributor corresponds to a delivery driver, the shipping module 228 may respond to such an indication by providing route information to a device of the driver for distribution of items 120 contained in the receptacle 100. As another example, the inventory module 226 may communicate with third party computers 214 or a user device 204 to prompt a distributor to take a photograph of the receptacle 100 and/or its contents. In some aspects, such a photograph may be obtained using a camera built-in to or otherwise in communication with a device or unit used by the distributor to interact with the service provider computers 216. Such a photograph may be utilized, for example, for verification purposes to determine if any items were damaged in transit or to serve as a confirmation from the distributor that all items were received, e.g., in case a dispute arises later. In some embodiments, in addition to or in lieu of such photographs from the distributor end, photographs may be taken by operators of the service provider, such as in association with the operation at 514 of configuring the receptacle from the packing mode (e.g., once all items to be sent have been placed in the receptacle 100) to the shipping mode (e.g., in which the receptacle may not readily permit items to be added or removed in the absence of configuring to the deployed mode).

Figure 6:
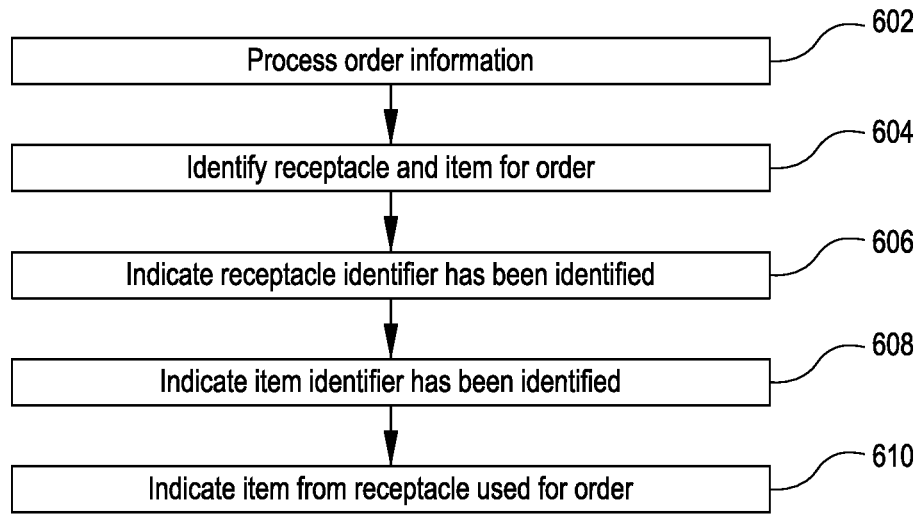
FIG. 6 is a flowchart illustrating a process of fulfilling an order through a distributor such as by use of the receptacle of FIGS. 1-3 in accordance with embodiments.

FIG. 6 is a flow chart representing an example of a process 600 of fulfilling an order through a distributor such as by use of the receptacle 100 of FIGS. 1-3 in accordance with embodiments. The process 600 may utilize a receptacle 100 with contents entered into the inventory of the distributor as at operation 522 in FIG. 5.

The process 600 at 602 can include processing order information. For example, the order module 230 may receive an order from a user 102 through a user device 204 for an inventory item 120.

The process 600 at 604 can include identifying a receptacle and an item for the order. For example, the inventory module 226 can determine that the item 120 ordered by the user 102 is available in a particular receptacle 100 that is in the custody of the distributor. The inventory module 226 may provide information about the receptacle 100 and item 120 to the distributor so that the distributor can locate the respective receptacle 100 and item 120 for fulfilling the order.

The process 600 at 606 can include indicating that the receptacle identifier has been identified. For example, the inventory module 226 may receive an indication that an identifier 124 such as the RFID tag 124B and/or the barcode 124A has been read.

The process 600 at 608 can include indicating that an item identifier has been identified. For example, the inventory module 226 may receive an indication that an identifier item has been read (e.g. such as from an operator scanning a barcode, RFID tag, and/or other identification device of the item 120).

The process 600 at 610 can include indicating the item 120 from the receptacle 100 was used for the order. For example, the inventory module 226 may provide such an indication to the order module 230 based on the combination of the respective indications received at 606-608.

Figure 7:
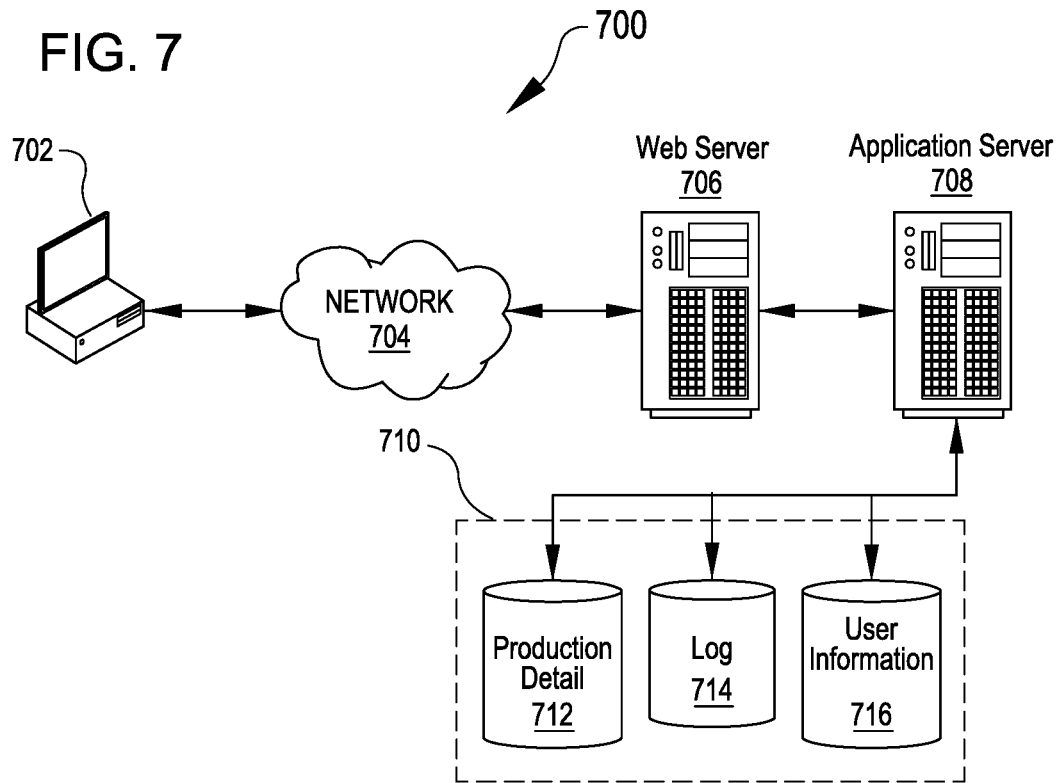
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory receptacle, comprising:
a body formed by a plurality of walls and configurable from a packing mode to a shipping mode and from the shipping mode to a deployed mode, the plurality of walls comprising a top wall, a bottom wall, a left wall, a right wall, a front wall, and a rear wall arranged in the shipping mode to at least partially bound a storage volume;
a flap defined by a perforation pattern disposed on the front wall and the top wall, the flap separable from the body to configure the body from the shipping mode to the deployed mode in response to tearing along the perforation pattern;
a computer-readable identifier comprising at least one of a barcode or a radio frequency identification (RFID) tag, the computer-readable identifier positioned with respect to the body such that the computer-readable identifier is: (a) readable in the packing mode to facilitate updating an electronically-stored record associated with the computer-readable identifier to reflect items placed into the storage volume, (b) not readable when concealed and obstructed by a presence of the flap in the shipping mode, and (c) rendered readable when exposed by an absence of the flap in the deployed mode to facilitate accessing the electronically-stored record for determining items registered as being present in the storage volume; and
a human-readable identifier comprising some combination of numbers, text, and/or other symbols configured for indicating at least one of a unique identity or a location of the inventory receptacle so as to facilitate access by a person to the receptacle in the deployed mode for retrieval of an item registered as being present in the storage volume.

2. The inventory receptacle of claim 1, wherein the plurality of walls comprise cardboard material.

3. The inventory receptacle of claim 1, wherein the computer-readable identifier comprises the RFID tag, and wherein the cover comprises a shielding material configured to block transmission from the RFID tag when the shielding is proximate to the RFID tag in the shipping mode.

4. The inventory receptacle of claim 1, wherein the plurality of walls is arranged in the shipping mode to enclose the storage volume.

5. An inventory receptacle, comprising:
a body comprising a plurality of walls arranged to at least partially bound a storage volume;
a computer-readable identifier connected with the body and associated with an electronically-stored record about items registered as being present in the storage volume; and
a cover detachably coupled with the body so as to at least partially bound the storage volume in an arrangement that blocks access to the computer-readable identifier and to the storage volume, the cover being configured for detachment from the body so as to allow access to the computer-readable identifier and the storage volume, wherein the computer-readable identifier is positioned with respect to the body such that the computer-readable identifier is not readable when obstructed by the cover, and the computer-readable identifier is rendered readable when the cover is detached from the body.

6. The inventory receptacle of claim 5, further comprising a human-readable identifier comprising some combination of numbers, text, and/or other symbols configured for indicating at least one of a unique identity or a location of the inventory receptacle;
wherein the cover is detachably coupled with the body so as to at least partially bound the storage volume in an arrangement that blocks access to the computer-readable identifier, to the storage volume, and to the human-readable identifier; and wherein the cover is configured for detachment from the body so as to allow access to the computer-readable identifier, the human-readable identifier, and the storage volume.

7. The inventory receptacle of claim 1, further comprising a shipping label affixed to the body.

8. The inventory receptacle of claim 6, further comprising a perforation pattern defined in the body of the receptacle, the cover being configured for detachment from the body in response to tearing along the perforation pattern.

9. The inventory receptacle of claim 1, wherein the computer-readable identifier comprises a bar code.

10. The inventory receptacle of claim 1, wherein the computer-readable identifier comprises a radio frequency identification (RFID) tag.

11. The inventory receptacle of claim 1, wherein the flap comprises a disabler configured to disable the computer-readable identifier when the disabler is present in contact or proximate to the computer-readable identifier.

12. The inventory receptacle of claim 1, wherein the computer-readable identifier is associated with an electronically-stored record about a delivery route for items registered as being present in the storage volume.

13. A computer-implemented method comprising:
under the control of one or more computer systems configured with executable instructions, identifying a distributor;
causing shipment of an inventory receptacle to a location associated with the identified distributor, wherein the inventory receptacle contains items registered as present within the inventory receptacle but not identified as available for fulfillment of orders, the inventory receptacle comprising:
a cardboard body; and
a perforation pattern that defines a flap separable from the cardboard body in response to tearing along the perforation pattern so as to expose a computer-readable identifier, wherein the computer-readable identifier is positioned with respect to the cardboard body such that the computer-readable identifier is not readable when obstructed by the flap, and the computer-readable identifier is rendered readable when the flap is separated from the receptacle;
receiving, from the distributor, an indication that the flap has been separated from the cardboard body of the inventory receptacle, thereby permitting access to the computer-readable identifier of the inventory receptacle; and
in response to receiving the indication, changing a designation of the items registered as present within the receptacle from not available for fulfilment of orders to available for fulfillment of orders.

14. The method of claim 13, further comprising:
receiving an order identifying an item for fulfillment to a customer; and
identifying the inventory receptacle as containing an item for fulfilling the order.

15. The method of claim 14, further comprising:
providing information for locating the inventory receptacle based on the inventory receptacle being identified as containing the item for fulfilling the order; and
providing information for identifying the item based on the inventory receptacle being identified as containing the item for fulfilling the order.

16. The method of claim 15, further comprising:
receiving an indication that the computer-readable identifier of the inventory receptacle has been identified;
receiving an indication that an item identifier has been identified; and
indicating that the item from the receptacle was used for the order based at least in part on the indication that the computer-readable identifier of the inventory receptacle has been identified and the indication that an item identifier has been identified.

17. The method of claim 13, wherein receptacle receiving the indication that the flap has been separated from the cardboard body of the inventory receptacle comprises receiving an indication that the computer-readable identifier has been read.

18. The method of claim 17, wherein the computer-readable identifier comprises a barcode.

19. The method of claim 17, wherein the computer-readable identifier comprises a radio frequency identification (RFID) tag.

20. A method, comprising:
causing shipment of an inventory receptacle to a location associated with a distributor, the inventory receptacle comprising:
a cardboard body; and
a perforation pattern configured to define a flap separable from the cardboard body in response to tearing along the perforation pattern so as to expose a computer-readable identifier, wherein the computer-readable identifier is positioned with respect to the cardboard body such that the computer-readable identifier is not readable when obstructed by the flap, and the computer-readable identifier is rendered readable when the flap is separated from the receptacle;
blocking reading of the computer-readable identifier by the flap during shipment of the inventory receptacle;
exposing the computer-readable identifier by separating the flap from the cardboard body after shipment of the inventory receptacle; and
identifying, based on the computer-readable identifier, one or more items registered as present within the inventory receptacle as available for fulfillment of orders by users.

* * * * *